April 21, 1936.                W. PRUITT                2,038,197
                                PIE KNIFE
                           Filed Feb. 11, 1935
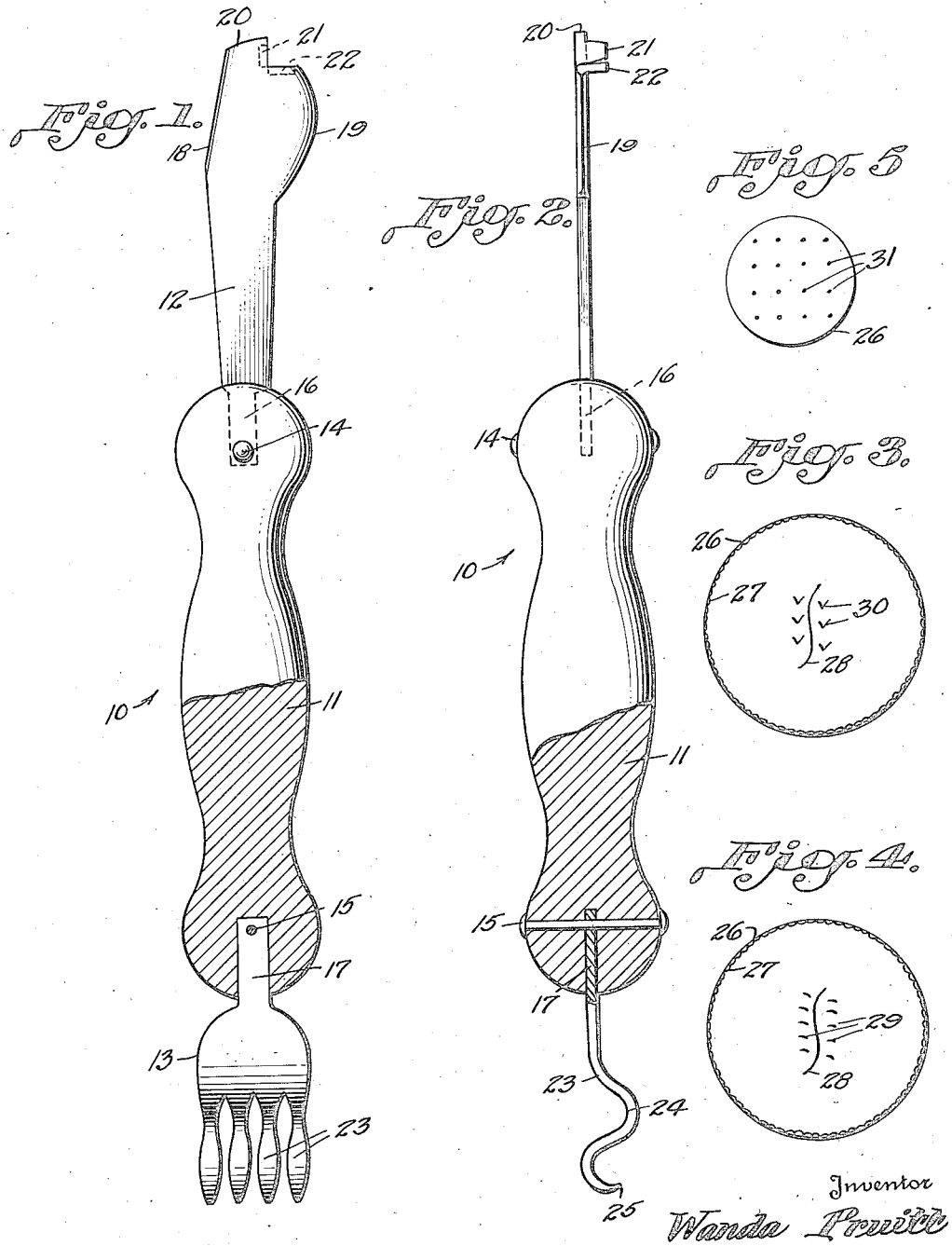
Inventor
Wanda Pruitt
By Miller & Miller
Attorneys Patented Apr. 21, 1936

2,038,197

UNITED STATES PATENT OFFICE 2,038,197

PIE KNIFE

Wanda Pruitt, Detroit, Mich.

Application February 11, 1935, Serial No. 6,085

2 Claims. (Cl. 107—47)

This invention relates to a pie knife and has for an object to provide an improved pie knife especially intended for forming designs on pies and for trimming the edge of the pie.

A further object of this invention is to provide an improved pie knife which may be used both for cutting the dough around the edge of the pie and shaping it to the pan and for pricking through the pie crust when necessary for decorative purposes or for allowing steam therein to escape therethrough.

Furthermore, the pie knife of this invention also includes as an integral part thereof a fork shaped member which not only serves to prick the dough, but also as a hook means for pulling the pie in the process of being baked to the front of the oven in which it is being baked, making the pie easy to handle or remove from the oven.

With the foregoing and other objects in view, as will hereinafter become apparent, this invention comprises the constructions, combinations, and arrangements of parts hereinafter set forth, disclosed and shown on the accompanying drawing. In this drawing, Figure 1 is a front view of the invention partly shown in section, Figure 2 is a side elevation of the same, and, Figures 3, 4 and 5 are diagrammatic views of three designs formed with the knife.

There is shown at 10 the pie knife constituting this invention. This pie knife 10 includes a handle 11 made of suitable material to one end of which is secured a blade member 12 and to the other end is secured a fork member 13. The fork member 13 and the blade member 12 are each secured to the handle 11 by means of rivets 14 and 15 which extend through opposite sides of the handle 11 and through extensions 16 and 17 of the knife member 12 and fork member 13, which extensions are inserted into suitably provided slots in the handle 11, thus making a secure fastening means which will hold the knife member 12 and fork member 13 rigidly in position.

The knife member 12 is provided with a sharpened straight blade edge 18 which is formed at a slight angle to the longitudinal length of the knife member 12, while on the opposite sides a sharp blade edge 19 is provided, this edge 19, however, being substantially curved as shown in Figure 1. The knife edges 18 and 19 do not meet, however, but are separated a substantial distance, and in this edge separating the ends of the knife blade edges 18 and 19 is provided a somewhat dulled edge 20 and a pair of prongs 21 and 22, bent at right angles to the plane of the knife member 12.

The fork member 13 is provided with a plurality of tines 23, which are curved substantially as shown at 24 in Figure 2, and terminate in somewhat hooked tine points 25. The tines 23 are therefore formed with concave and convex surfaces near their lower ends.

In Figures 3, 4 and 5 there are shown pies which are made up with the aid of the pie knife and of this invention. The knife edge 18 serves for cutting the dough around the edge 26 of the pie. The curve 24 of fork member 13 is then used for crimping the dough as at 27 around the edges 26, of the pie. The curved blade 19 is used in making the curved slits 28 in the top of the pie, these slits 28 being both decorative and serving to permit escape of steam as the pie is being baked. The dulled edge 20 provides the impression 29 in the pie of Figure 4. The prongs 21 and 22 are useful in making the design 30 in the pie. The curved tine points 25 may be used for pricking the dough of the pie as at 31, in Figure 5. The depth of these pricks 31 may be gauged by resting the curve 24 against the top of the dough and holding the handle 11 at an appropriate angle.

After the pie has been baked in the oven, then the hook of the tine points at 25 may be caught under the edge of the pie pan or in the top of a pie crust, if necessary, to draw the baked pie to the edge of the oven, making it easy to handle or remove.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. As an article of manufacture, a pie utensil comprising a handle member, a pie cutting and decorating blade secured to said handle member, said blade having a straight sharpened edge along one side thereof, a curved sharpened edge along the opposite side thereof, and having a dull edge separating the ends of said straight and curved sharpened edges, said dulled edge having an angular notch formed therein, and prong members projecting from the sides of said notch at an angle to the plane of the blade.

2. As an article of manufacture, a pie utensil comprising a handle member, a pie cutting and decorating blade secured to said handle member, said blade having a straight sharpened edge along one side thereof, a curved sharpened edge along the opposite side thereof and having a dull edge separating the ends of said straight and curved sharpened edges, said dulled edge having an angular notch formed therein, prong members projecting from the sides of said notch at an angle to the plane of the blade, and one of the said prong members being spaced above and to one side of the other prong member.

WANDA PRUITT.